United States Patent [19]

Taylor

[11] Patent Number: 5,436,947
[45] Date of Patent: Jul. 25, 1995

[54] ZIRCONIUM ALLOY FUEL CLADDING

[75] Inventor: Dale F. Taylor, Schenectady, N.Y.

[73] Assignee: General Electric Company, San Jose, Calif.

[21] Appl. No.: 215,453

[22] Filed: Mar. 21, 1994

[51] Int. Cl.$^6$ .............................................. G21C 3/00
[52] U.S. Cl. ..................... 376/416; 376/414; 376/457
[58] Field of Search ............... 376/416, 260, 305, 414, 376/457, 261; 976/DIG. 44, DIG. 53; 148/672, 590

[56] References Cited

U.S. PATENT DOCUMENTS

| | | | |
|---|---|---|---|
| 3,850,584 | 11/1974 | Bohm et al. | 29/194 |
| 4,671,826 | 6/1987 | Prizzi | 148/11.5 F |
| 4,810,461 | 3/1989 | Inagaki et al. | 376/457 |
| 4,863,679 | 9/1989 | Imahashi et al. | 376/417 |
| 4,894,203 | 1/1990 | Adamson | 376/416 |
| 5,188,676 | 2/1993 | Taylor | 148/217 |
| 5,247,550 | 9/1993 | Perkins et al. | 376/416 |
| 5,297,177 | 3/1994 | Inagaki et al. | 376/462 |

OTHER PUBLICATIONS

Armand, M.; Demars, J. P. Givord; and Trolliet, G., "Influence of the Structure and the Interstitial Impurities on the Corrosion of Zircaloy-2 by Water and Steam", Journal of the Electrochemical Socity, vol. 4, pp. 104–108, 1966.

Kass, S.; Grozier, J. D.; and Shubert, F. L., "Effects of Silicon, Nitrogen and Oxygen on the Corrosion and Hydrogen Absorption of Zircaloy-2", Corrosion (NACE) vol. 20 pp. 350t–360, 1964.

Rubenstein, L. S.; Goodwin, J. G.; and Shubert, F. L., "Effect of Five Impurities on the High Temperature Water And Steam Corrosion Resistance of Zircaloy-2", Corrosion (NACE) vol. 18, pp. 45t–54t, 1962.

Primary Examiner—Donald P. Walsh
Assistant Examiner—Meena Chelliah
Attorney, Agent, or Firm—James E. McGinness; Jeffrey K. Weaver

[57] ABSTRACT

A cladding is provided for use in housing fissionable material in water cooled nuclear fission reactors. The cladding has inner and outer surfaces and includes (1) a cross-section of a Zirconium-based alloyed matrix, and (2) alloying elements in sufficient concentration to form precipitates disposed in the matrix. The cladding includes no more than 20 parts per million nitrogen by weight and is typically a modified Zircaloy-2 or Zircaloy-4. Metallurgically bonded to the inner region of the cladding is a zirconium barrier layer.

24 Claims, 4 Drawing Sheets

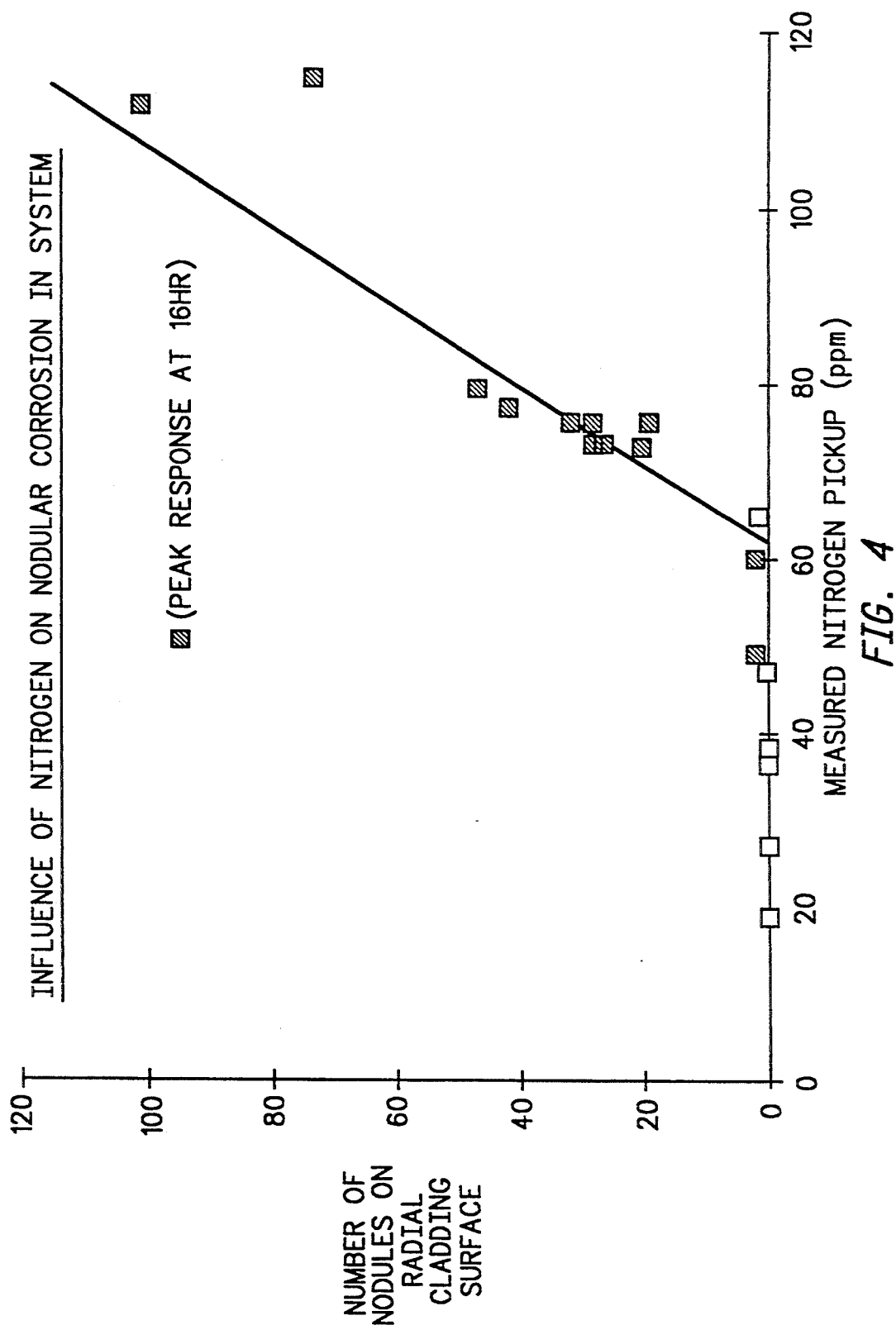

ZIRCONIUM ALLOY FUEL CLADDING

This invention relates to Zircaloy cladding for use in nuclear fuel elements. More particularly, the invention relates to cladding having improved nodular corrosion resistance while maintaining uniform corrosion resistance and axial crack propagation resistance.

BACKGROUND OF THE INVENTION

Nuclear reactors have their fuel contained in sealed cladding for the isolation of the nuclear fuel from the moderator/coolant system. The term cladding, as used herein, refers to a zirconium-based alloy tube composed of at least one metal in addition to the zirconium base. The cladding may be composed of more than one layer including a zirconium alloy substrate and an unalloyed zirconium barrier. Typically, the cladding is formed in the shape of a tube with the nuclear fuel contained in pellet form therein. These pellets are stacked in contact with one another for almost the entire length of each cladding tube, which cladding tube is in the order of 160 inches in length. Typically, the cladding tube is provided with springs for centering the fuel pellets and so-called "getters" for absorbing fission gases. Thereafter, the internal portions of the fuel rod are pressurized with various gases for optimum dissipation of gases produced from the fission reaction, and sealed at both ends.

Zirconium and its alloys, under normal circumstances, are excellent nuclear fuel cladding since they have low neutron absorption cross sections and at temperatures below about 398° C. (at or below the core temperature of the operating reactor) are strong, ductile, stable, and nonreactive in the presence of demineralized water or steam. "Zircaloys" are a widely used family of corrosion-resistant zirconium alloy cladding materials. The Zircaloys are composed of 97–99% by weight zirconium, with the balance being tin, iron, chromium, and nickel. "Zircaloy-2" and "Zircaloy-4" are two widely-used zirconium-based alloys for cladding. Zircaloy-2 has on a weight basis about 1.2 to 1.7 percent tin; 0.13–0.20 percent iron; 0.06–0.15 percent chromium and 0.05 to 0.08 percent nickel. Zircaloy-4 has essentially no nickel and about 0.2% iron but is otherwise substantially similar to Zircaloy-2.

The presence of alloying elements which are relatively insoluble in zirconium under normal conditions, will generally result in "precipitates" forming within a zirconium matrix. Under equilibrium conditions, the matrix—which is a single phase—will contain the alloying elements at concentrations no higher than their solubility limit. The precipitates—which form a second phase—contain higher concentrations of the alloying elements. For example, the precipitates found in the Zircaloys are represented by chemical formulas such as $Zr(Fe,Cr)_2$ and $Zr_2(Fe,Ni)$.

Cladding corrosion is a potential problem both in boiling water reactors (BWRs) and pressurized water reactors (PWRs). Corrosion in a BWR occurs in nodular or uniform formats on the zirconium cladding. Nodular corrosion is usually a porous, stoichiometric $ZrO_2$ oxide forming on the surface of the cladding. It can rapidly cover the entire surface of pure zirconium, but it tends to form as small patches ("nodules" or "pustules") on the surface of the Zircaloys. Uniform corrosion is also a $ZrO_2$ oxide forming on the surface of the cladding, but it usually contains a small excess of zirconium. As such, it contains excess electrons giving it a black or gray color and semiconductor properties.

Nodular or pustule corrosion is not inherently bad. However, where fuel in the reactor has longer life, nodular corrosion may concentrate. And where such concentrated nodular corrosion acts in conjunction with certain contaminants—such as copper ions—localized spalling and ultimately penetration of the cladding wall can occur.

Various approaches have been taken to minimize or eliminate nodular corrosion and the damage it can cause to cladding. In one widely used approach, the concentration of alloying elements (particularly iron, nickel, and chromium) in Zircaloy alloy is increased. This has been found to actually reduce the severity of nodular corrosion under reactor conditions. Unfortunately, increased concentrations of alloying elements also leads to increased rates of corrosion due to uniform corrosion. Even at such elevated rates, uniform corrosion has not been a significant problem in reactors operated under conditions common in the past. Today, however, it is increasingly common to operate reactors at high "burn-up" (i.e., to nearly complete consumption of the nuclear fuel). Under these conditions, the cladding is exposed to a neutron flux for long periods, a condition which tends to increase the degree of uniform corrosion. Thus, uniform corrosion can become a significant problem in modern reactor operation.

In another approach to nodular corrosion containment, the precipitates in the Zircaloy matrix are purposely made small (e.g., less than about 0.1 micrometer in diameter). They may be made small throughout the entire cross-section of the cladding or only in certain regions. For example, it is known to externally treat the outer water exposed surface of cladding with heating from a coil to produce a fine precipitate exterior surface. See Eddens et al. U.S. Pat. No. 4,576,654. Unfortunately, some research has suggested that small precipitates in the Zircaloy metal matrix can increase the danger of crack propagation in the cladding axial direction. See, for example, U.S. patent application No. 08/052,793, entitled ZIRCALOY TUBING HAVING HIGH RESISTANCE TO CRACK PROPAGATION and U.S. patent application Ser. No. 08/052,791, entitled METHOD OF FABRICATING ZIRCALOY TUBING HAVING HIGH RESISTANCE TO CRACK PROPAGATION, both of which were filed on Apr. 23, 1993, naming Adamson et al. as inventors, assigned to the assignee hereof, and are incorporated herein by reference for all purposes. These applications describe a cladding having a microstructure in which coarse precipitates predominate in the inner regions of the cladding and fine precipitates predominate in the outer regions of the cladding, the regions where corrosion is a problem.

Corrosion and cracking can both damage cladding, but they are fundamentally different phenomena. Cracking is a mechanical breaking or splitting of the cladding wall, while corrosion is an electrochemical conversion of the cladding metal into an oxide or other non-metallic compound. Cracks may be initiated by a variety of causes including mechanical stresses as well as corrosion. Once a crack is initiated, it may pose little problem, so long as it remains confined to a small area. However, if the crack propagates, the cladding can be breached and the fission material eventually contacts the coolant or moderator. Ultimately, this can lead to an expensive reactor outage.

The mechanical initiation of cracks can be attributed to various stresses in a conventional reactor. Cracks can start when debris such as wires or metallic shavings or particles find their way into reactor water that flows within the fuel bundles between the fuel rods. The debris may lodge at a fuel rod spacer adjacent the cladding wall. As a result, the debris vibrates or frets against the cladding wall under the influence of the passing steam/water mixture. Corrosion can be the source of initial crack propagation. Moreover, manufacturing defects can be the points of crack origin. Still further, crack propagation can start on the inside of the fuel rods in the corrosive high pressure environment present during in-service reactor life.

U.S. Pat. Nos. 4,200,492 and 4,372,817, to Armijo et al as well as Adamson U.S. Pat. No. 4,894,203—each of which is incorporated herein by reference for all purposes—suggest solutions to preventing crack initiation by including a barrier on the inside of the cladding. Cladding containing barriers are sometimes referred to as "composite" cladding or cladding having two distinct metallurgical layers.

Although it is highly desirable to prevent nodular corrosion of zirconium alloy cladding, it is also desirable to prevent uniform corrosion at high burn-up and to prevent axial crack propagation. There exists a need for cladding which is resistant to nodular corrosion while retaining resistance to uniform corrosion at high burn-up and axial crack propagation.

SUMMARY OF THE INVENTION

The present invention is directed to low-nitrogen zirconium alloy cladding resisting nodular corrosion while used to house fissionable material in water cooled nuclear fission reactors. The invention also provides methods of making such cladding. Preferably, the low nitrogen zirconium alloy cladding is a Zircaloy tube having less than 20 parts per million (ppm) nitrogen by weight.

The low-nitrogen alloys of this invention show surprising resistance to nodular corrosion. In addition to their obvious direct benefit (resistance to nodular corrosion), the alloys of this invention have other secondary advantages. First, because they show improved resistance to nodular corrosion, they may employ lower concentrations of alloying elements (e.g., iron, nickel, and chromium). Such low concentration alloys (e.g., a modified Zircaloy having low nickel, iron, and chromium, in addition to low-nitrogen) will resist uniform corrosion at high burn-up. Second, the claddings of this invention need not rely on a microstructure having fine precipitates for nodular corrosion resistance. In fact, preferred cladding will have course precipitates (e.g., greater than about 0.2 micrometers in diameter) throughout the Zirconium alloy matrix. Such cladding resists crack propagation in the axial direction as well as nodular corrosion. Further, such cladding is relatively easy to produce because the late beta quenches and localized induction anneals normally employed to generate a fine precipitate distribution are unnecessary in this invention.

In a preferred embodiment, the cladding will include no more than about 20 ppm nitrogen by weight in a Zirconium-based alloy matrix having alloying elements in concentrations sufficient to form precipitates disposed throughout matrix. Preferably, the Zirconium-based alloy will be a modified Zircaloy-2 or Zircaloy-4 having alloying elements present in the concentration ranges of about 0.05 to 0.09 weight percent iron, about 0.03 to 0.05 weight percent chromium, and about 0.02 to 0.04 weight percent nickel. In some embodiments, the cladding will have a controlled microstructure in which the precipitates proximate to an inner surface of a cladding tube will have an average size distribution of at least about a first predefined diameter and the precipitates proximate to an outer surface will have an average size distribution of at most about a second predefined diameter, such that the first predefined diameter is greater than the second predefined diameter. In especially preferred embodiments, the first predefined diameter will be about 0.2 micrometers, and the second predefined diameter 0.1 micrometers.

In another aspect, the present invention provides a method of preparing a cladding for use in housing fissionable material in a water cooled nuclear fission reactor. The cladding will be prepared by converting a Zircaloy tube containing at most about 20 ppm nitrogen to a cladding containing at most 20 ppm nitrogen through a plurality of steps including cold working and annealing. Each step in this process that is conducted at a temperature above about 500° C. is conducted in a low-nitrogen environment (i.e., an environment sufficiently low in nitrogen that the zirconium can not pick up significant additional nitrogen, e.g. 1-2 ppm). Preferably the low-nitrogen environment is a vacuum or argon atmosphere. In some embodiments, the plurality of processing steps will include at least one step of conditioning the surface of the cladding such that an outer layer of material is removed. Such processing steps are well known to those of skill in art and include, for example, honing, machining with a lathe, chemical etching and mechanical polishing. Such surface conditioning steps, serve to remove the material that is most likely to have taken up nitrogen during processing. Thus, the underlying nitrogen-free regions form the outer surface of the cladding.

These and other features of the present invention will be presented in more detail in the following specification of the invention and the figures.

BRIEF DESCRIPTION OF THE DRAWINGS

FIG. 4 is a graph showing the amount of nodular corrosion as a function of nitrogen concentration in Zircaloy-2.

DESCRIPTION OF THE PREFERRED EMBODIMENTS

I. THE TUBING STRUCTURE

As used herein, the term "tubing" refers to a metal tube having various uses, and the term "fuel rod container" or simply "container" refers to tubing used in fuel rods to enclose fuel pellets. Sometimes the fuel rod container is referred to as "cladding" or "cladding tube". The container will have an associated thickness or cross-section formed from a zirconium-based alloy of this invention.

Figure 1:
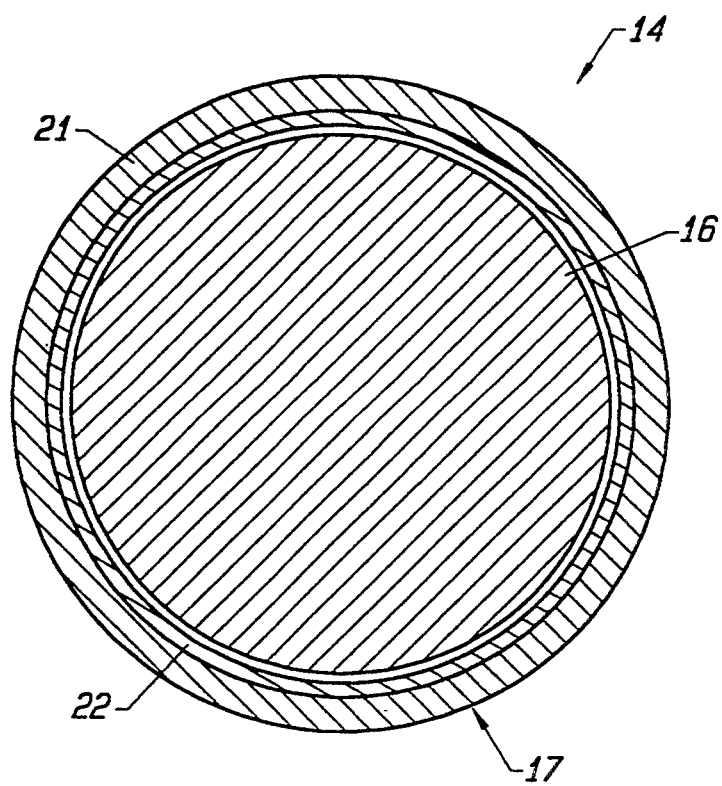
FIG. 1 is a cross sectional view of a nuclear fuel element of this invention having a substrate and a barrier layer liner.

Referring to FIG. 1, a fuel element 14 (commonly referred to as a fuel rod) includes a fuel rod container 17 surrounding a fuel material core 16. The fuel element 14 is designed to provide excellent thermal contact between the fuel rod container 17 and the fuel material core 16, a minimum of parasitic neutron absorption, and resistance to bowing and vibration which are occasionally caused by flow of coolant at high velocity. The fuel material core is typically a plurality of fuel pellets of fissionable and/or fertile material. The fuel core may have various shapes, such as cylindrical pellets, spheres, or small particles. Various nuclear fuels may be used, including uranium compounds, thorium compounds and mixtures thereof. A preferred fuel is uranium dioxide or a mixture comprising uranium dioxide and plutonium dioxide.

The container 17 is a composite cladding having a structure including a zirconium alloy substrate 21 and a zirconium barrier 22. In alternative embodiments, the cladding also includes an inner layer or liner (not shown) metallurgically bonded to the inner surface of the zirconium barrier. In other alternative embodiments, the container will contain only substrate 21 and not the zirconium barrier layer. The substrate will have an outer circumferential region and an inner circumferential region, with the zirconium barrier metallurgically bonded to the inner circumferential region.

The substrate may be made from a low-nitrogen version of a zirconium alloy employed in conventional cladding. Most generally, any zirconium alloy may be employed that contains alloying elements in sufficient concentration to form precipitates while retaining the strength and ductility necessary in fuel cladding tubes. Suitable zirconium alloys for the substrate preferably include at least about 98% zirconium, up to about 0.25% iron, up to about 0.1% nickel, up to about 0.15% chromium, and up to about 1.7% tin (all percents by weight). In a preferred embodiment of this invention, the substrate is a low-nitrogen version of Zircaloy-2 or Zircaloy-4. As will be explained below, it is often desirable that the cladding have relatively low concentrations (in comparison to the Zircaloys) of some alloying elements, most notably iron, nickel, and chromium.

Preferably, the zirconium-alloys of this invention will have no more than about 50 ppm nitrogen, more preferably no more than about 30 ppm nitrogen, and most preferably no more than about 20 ppm nitrogen. While not wishing to be bound by theory, it is believed that the presence of nitrogen raises the activity coefficient of alloying elements such as iron and nickel thereby reducing their concentration in the matrix. The activity of an alloying element (or any chemical species) is the product of its concentration and activity coefficient. Thus, when nitrogen is present in a significant concentration (e.g., greater than about 20 ppm), it is believed that the concentration of alloying elements dissolved in the matrix decreases and the alloy becomes more susceptible to nodular corrosion.

Unfortunately, when the concentration of alloying elements (nickel and iron in particular) becomes too great, uniform corrosion can become a significant problem at high burn-up. Because the low-nitrogen cladding of this invention exhibits increased resistance to nodular corrosion, it is now possible to employ cladding having lower concentrations of the alloying elements. Thus, resistance to both nodular and uniform corrosion is improved. In preferred embodiments, the alloying element concentrations are provided in a dilution-factor range of 0.3 to 0.5 (of the concentrations employed in conventional Zircaloys). Thus, preferred alloys will have the following concentrations (on a per weight basis): 0.05–0.09 percent iron, 0.03–0.05 percent chromium, and 0.02–0.04 percent nickel. Although any alloy having alloying elements within these ranges is suitable, especially preferred alloys will have iron: chromium: nickel in the ratio of 3:2:1. This should provide an alloy having the precipitates $Zr(Fe,Cr)_2$ and $Zr_2(Fe,Ni)$ in approximately equal concentrations.

In some preferred embodiments, the substrate will have a microstructure (i.e. precipitate size distribution) that resists corrosion and/or crack propagation. It is known that the microstructure of Zircaloys and other alloys can be controlled by the anneal temperature and time as well as other fabrication parameters. It is also known that in boiling water reactors (BWRs), smaller precipitates generally provide superior resistance to corrosion while in pressurized water reactors (PWRs), larger precipitates generally provide superior resistance to corrosion. In either environment, coarse precipitates provide improved resistance to axial crack propagation. In a preferred embodiment, the substrate will have a distribution of coarse precipitates (e.g., greater than about 0.2 micrometers in diameter and preferably between about 0.2 and 1 micrometers in diameter) in the substrate. This will provide significant resistance to crack propagation in the axial direction.

In an alternative embodiment, a dense distribution of fine precipitate (e.g., between about 0.01 and 0.15 micrometers in diameter) is provided in the outer region (radially) of the substrate and a less dense distribution of coarse precipitates (e.g., between about 0.2 and 1 micrometers in diameter) in the inner region of the substrate. This embodiment will be especially preferred in BWRs. In PWRs, preferred substrates will have coarse precipitates distributed throughout. Detailed discussions of Zircaloy microstructure and methods of fabricating cladding having a desired microstructure are found in U.S. patent application Ser. Nos. 08/052,793 and 08/052,791, both of which were previously incorporated by reference.

Metallurgically bonded on the inside surface of substrate 21 is the zirconium barrier 22. See U.S. Pat. Nos. 4,200,492, and 4,372,817, to Armijo and Coffin, U.S. Pat. No. 4,610,842, to Vannesjo, and U.S. Pat. No. 4,894,203, to Adamson, each of which is incorporated herein by reference for all purposes. The barrier shields the substrate from the nuclear fuel material inside the composite cladding. Fuel pellet-induced stress may be introduced by, for example, swelling of the pellets at reactor operating temperatures so that the pellet presses against the cladding. In effect, the zirconium barrier deforms plastically to relieve pellet-induced stresses in the fuel element during swelling. The barrier also serves to inhibit stress corrosion cracking and protects the cladding from contact and reaction with impurities and fission products. The zirconium barrier maintains low yield strength, low hardness, and other desirable structural properties even after prolonged use because it is resistant to radiation hardening.

In preferred embodiments, the thickness of the barrier layer is between about 50 and 130 micrometers (approximately 2 to 5 mils) and more preferably between about 75 and 115 micrometers (approximately 3.2 to 4.7 mils). In a typical cladding, the zirconium barrier forms between about 5% to about 30% of the thickness or cross-section of the cladding.

Generally, the zirconium barrier layer may be made from unalloyed zirconium possessing the desired structural properties. Suitable barrier layers are made from "low oxygen sponge" grade zirconium, "reactor grade sponge" zirconium, and higher purity "crystal bar zirconium". In alternative embodiments, the barrier layer is alloyed with low concentrations of alloying elements such as the chromium, nickel, and iron used in the substrate. The alloying elements and the concentrations at which they appear should be chosen to impart additional corrosion resistance to the barrier layer while maintaining compliance sufficient to prevent damage from pellet-cladding interaction.

Figure 2:
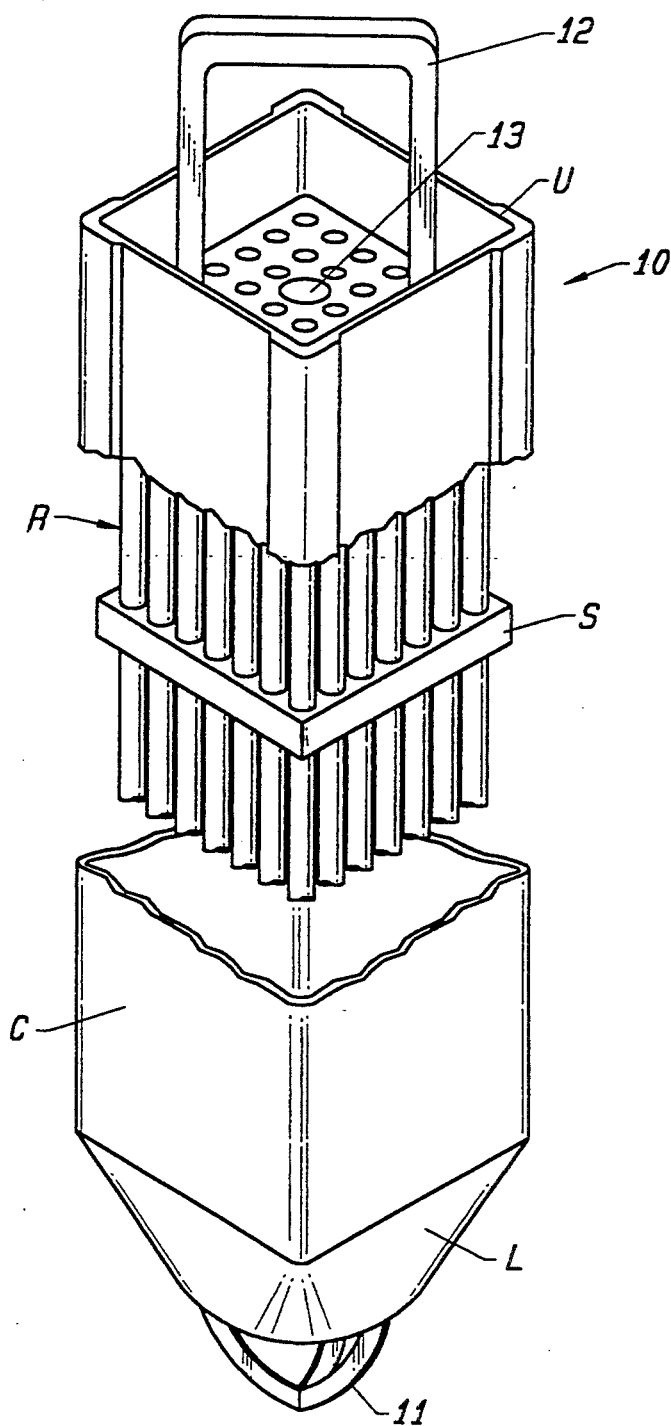
FIG. 2 is a partial cutaway perspective view of a nuclear fuel bundle containing a nuclear fuel rod.

Referring now to FIG. 2, a cutaway sectional view of a nuclear fuel bundle or assembly 10 is shown. The fuel bundle is a discrete unit of fuel containing many individual sealed fuel elements or rods R each containing a cladding tube of this invention. In addition, the fuel bundle consists of a flow channel C provided at its upper end with an upper lifting bale 12 and at its lower end with a nose piece L and lower lifting bale 11. The upper end of channel C is open at 13 and the lower end of the nose piece is provided with coolant flow openings. The array of fuel elements or rods R is enclosed in channel C and supported therein by means of upper tie plate U and lower tie plate (not shown). Certain of the fuel rods serving to "tie" the tie plates together—thus frequently being called "tie rods" (not shown). In addition, one or more spacers S may be disposed within the flow channel to hold the fuel elements in alignment with one another and the flow channel. During the in service life of the fuel bundle, the liquid coolant ordinarily enters through the openings in the lower end of the nose piece, passes upwardly around fuel elements R, and discharges at upper outlet 13 in partially vaporized condition.

Figure 3:
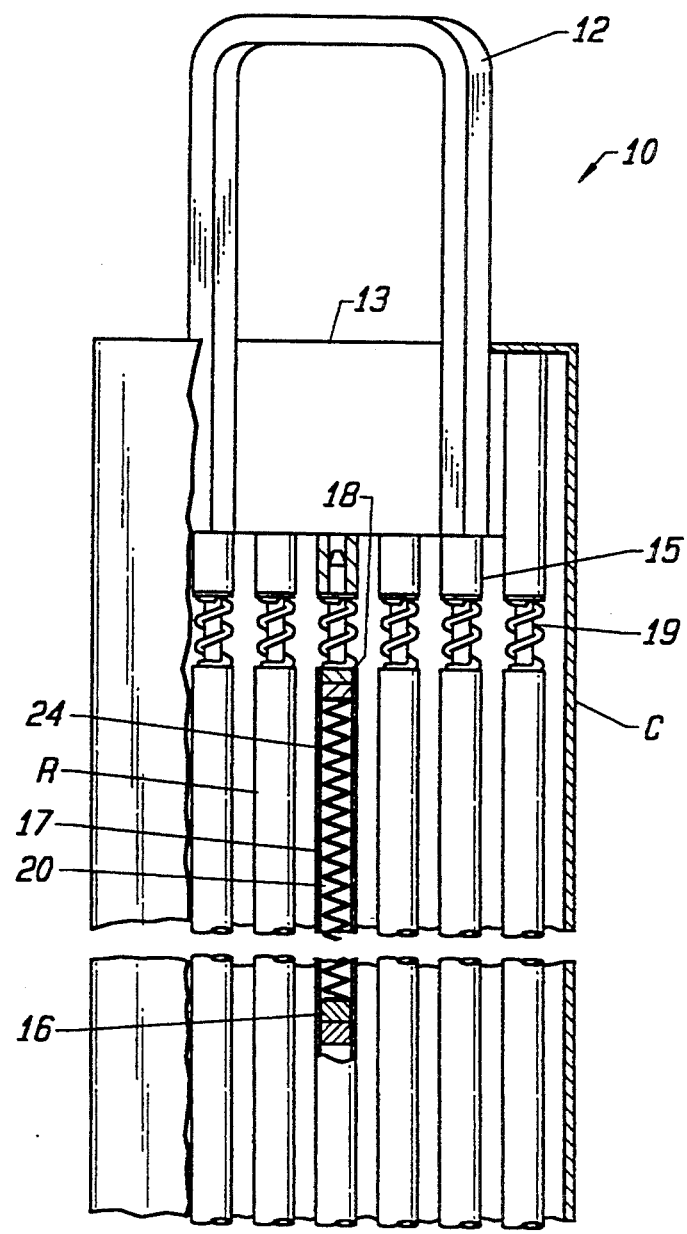
FIG. 3 is a partial cutaway sectional view of a nuclear fuel bundle showing the interior of a fuel rod.

Referring now to FIG. 3, the fuel elements or rods R are sealed at their ends by end plugs 18 welded to the fuel rod container 17, which may include studs 19 to facilitate the mounting of the fuel element in the fuel assembly. A void space or plenum 20 is provided at one end of the element to permit longitudinal expansion of the fuel material 16 and accumulation of gases released by the fuel material. A getter (not shown) is typically employed to remove various deleterious gases and other products of the fission reaction. A nuclear fuel material retainer 24 in the form of a helical member is positioned within space 20 to provide restraint against axial movement of the pellet column during handling and transportation of the fuel element.

II. MANUFACTURE OF THE TUBING

The low-nitrogen cladding tubes of this invention may be formed by various conventional processes with only minor modification. Most importantly, the process steps should be conducted so that exposure to nitrogen is limited, particularly in those steps where cladding is most susceptible to nitrogen diffusion. First, in preferred methods, the zirconium alloy starting material used to form the cladding will have a low bulk concentration of nitrogen, preferably less than about 20 ppm. Zircaloy ingots having this concentration of nitrogen are available from Teledyne Wahchang (Albany, Oreg.), Western Zirconium (Ogden, Utah) and Cezus (France).

Next, the process steps—particularly those conducted at temperatures at or above about 500° C.—are performed in a low-nitrogen environment. Typically, an inert atmosphere such as a vacuum or an argon atmosphere is used for this purpose. Suitable vacuum annealing furnaces are available from Centorr Vacuum Industries of Nashua, N.H.

Finally, if it appears that some nitrogen may have penetrated a short distance through the surface, a chemical or mechanical surface conditioning step such as etching can be employed to remove any nitrogen that might have entered the Zircaloy. Chemical and mechanical surface conditioning steps are currently employed in cladding fabrication. These include honing, grinding, sanding, machining with a lathe, buffing, chemical etching, and chemical mechanical polishing.

As noted, in preferred embodiments, the zirconium alloy matrix will contain a distribution of relatively coarse precipitates. The size of the precipitate can be controlled by various manufacturing processes. Initially, the precipitate size is governed essentially by the cooling or quenching rate from the beta phase. The beta phase refers to the body-centered cubic crystal lattice structure of crystalline zirconium and Zircaloy that is stable at higher temperatures (i.e., above about 960° C. for Zircaloy-2). A different phase, the alpha phase, is a close-packed hexagonal crystal lattice structure of zirconium and Zircaloy that is stable at lower temperatures. Between about 825° C. and 960° C., the alpha and beta phases can coexist in Zircaloys. Rapid quenching rates from the beta phase (e.g. faster than about 50° C. per second) give smaller precipitates, while slower cooling rates give larger precipitates. The initial precipitate sizes (obtained by quenching from the beta phase) can be altered somewhat by later heat treatments such as annealing at a high temperature within the alpha phase field (e.g. between about 600°–825° C.). This allows the smaller precipitates to dissolve and some of the nickel, iron and chromium components of the Zircaloy matrix phase to diffuse to larger precipitates, causing the precipitates to coarsen. A guideline widely applicable to various processes is provided by the "accumulated normalized annealing time" defined in F. Garzarolli, et at., "Progress in the Knowledge of Nodular Corrosion", Zirconium in the Nuclear Industry, ASTM STP939, pp. 417–430 (1987), which is incorporated herein by reference for all purposes. The accumulated normalized annealing time includes contributions from the duration, temperature, and number of annealing steps employed in the complete process. Generally, longer and higher temperature anneals will produce coarser precipitates. Preferably, to ensure sufficiently coarse precipitates, the accumulated normalized annealing time should be greater than about $10^{-17}$ hours.

To obtain the final tubing of the necessary dimensions, various other manufacturing steps such as cold-working, extruding, heat treating, and annealing may be employed. The equipment and operating conditions necessary to carry out these various steps will be readily apparent to those of skill in the art, and are described in U.S. patent application Ser. No. 08/052,791, entitled METHOD OF FABRICATING ZIRCALOY TUBING HAVING HIGH RESISTANCE TO CRACK PROPAGATION and previously incorporated herein by reference.

In an exemplary embodiment, a hollow billet of zirconium alloy having a nitrogen concentration at or below about 20 ppm is beta quenched from 1000° C. to about 700° C. by immersion in a tank of water. Next, the tube is extruded with the tube temperature being at about 570° C. by putting the tube through a set of tapered dies under high pressure. The extruded product is referred to as a "tubeshell" which is available in specified dimensions (and nitrogen levels of 20 ppm) from various vendors such as Teledyne Wahchang (Albany, Oreg.

USA), Western Zirconium (A Westinghouse company of Ogden, Utah), and Cezus (France).

Next, a first pass cold work to 70% is performed as in known processes followed by an anneal at a relatively high temperature (e.g. 650° C. for four hours in a vacuum). Next, a second pass cold work to 70% is performed followed by annealing at 650° C. for 2 hours (also in a vacuum). A third pass cold work and a recrystallization or stress relief anneal are performed under the same conditions as the known processes. At this point the tubing is suitable (with only minor modifications and testing) for use in a fuel rod.

If the cladding is to have a gradient in precipitate size (with smaller precipitates near the outer regions and larger precipitates for inner regions), a heat treatment is performed to regain the smaller precipitates on the outside of the tube. This treatment is performed at about 1045° C. in the pure beta phase (although it could be performed in the alpha plus beta phase). An induction coil rapidly heats the outer 15% of the tube to the desired temperature and then shuts off while water (or other cooling fluid) is flowing through the tube interior. This allows the tube to rapidly cool (sometimes within a matter of 2 seconds). The penetration of the induction coil energy can be tuned by adjusting the induction coil frequency, the induction coil energy, the speed at which the tube moves through the induction coil, and the water temperature (flow rate). One of skill in the art will appreciate how to adjust these conditions to achieve the type of heat treatment that will form small precipitates at the outer 15% of the tube. Further details can be found in U.S. Pat. No. 4,576,654, to Eddens. The resulting tube will have good nodular corrosion resistance while retaining coarse precipitates in the inner regions.

If the tubing of this invention is to contain a barrier layer, the fabrication process will have at least one additional step. Details of such a step are known in the art and are provided in, for example, U.S. Pat. No. 4,894,203. Usually, the barrier layer is bonded to the tubing as liner during an extrusion step. Other steps in the process are performed as described above.

III. EXAMPLE

FIG. 4 is a graph showing that the severity of nodular corrosion increases as nitrogen concentration increases in Zircaloy-2. More specifically, the number of nodules on a radial cladding surface increases dramatically as the nitrogen content in the Zircaloy increases. In this example, 0.40 inch length sections of Zircaloy-2 tubing were annealed for 9 to 81 hours at 750° C. The sections were exposed initially to a mixture containing equal concentrations of high purity nitrogen and argon gases for 0.25 to 12 hours. Only argon flowed through the annealing furnace for the balance of the time at 750° C. The total annealing time for most of the specimens was 24 hours.

This treatment allowed the nitrogen to partially—but not completely—diffuse through the Zircaloy sections. Thus, the nitrogen concentration most likely was greatest near the surfaces of the sections and dropped off progressively toward the centers. The total amount of nitrogen picked up by each section was measured gravimetrically. As would be expected, those sections exposed to the argon-nitrogen mixture for the longest time picked up the most nitrogen. Before exposure to corrosive conditions, the cladding sections were etched briefly to remove the exposed regions of the sections. The specimens were etched for 60 seconds in a solution containing 10:9:1 parts by volume of water, 70% nitric acid, and 50% hydrofluoric acid. This procedure removed about 0.6 mils (or 15 micrometers) from the exposed surface, and certainly removed some of the nitrogen containing material. Obviously, it did not remove all the nitrogen, as evidenced by the data showing progressively less resistance to corrosion as exposure to nitrogen increased.

To study the effect of nitrogen concentration on nodular corrosion, the sections were all subjected to the same corrosion conditions: exposure to steam at 510° C. and 1500 PSIG for 24 hours. The resulting sections were then examined and the number of nodules counted. As can be seen from FIG. 4, the number of nodules ranged from zero for low nitrogen alloys to near 100 for high nitrogen alloys. Also, the number of nodules on the sections remained at or near zero from a nitrogen pick-up of 20 ppm to a nitrogen pick-up of 60 ppm.

IV. CONCLUSION

Although the foregoing invention has been described in some detail for purposes of clarity of understanding, it will be apparent that certain changes and modifications may be practiced within the scope of the appended claims. For instance, although the specification has described preferred zirconium alloy tubes, other shapes may be used as well. For example, plates and metal sections of other shapes may also be used. In addition, the reader will understand that the metallurgy herein can be used in reactor pans other than cladding. For example, the Zirconium alloy composition here taught may be used with water rods, spacers, channels and other Zirconium alloy structures and their equivalent within the reactor.

What is claimed is:

1. A cladding resisting nodular corrosion while used to house fissionable material in a water cooled nuclear fission reactor, the cladding comprising inner and outer surface regions, and including
    a cross-section of a zirconium-based alloy matrix; and
    alloying elements in sufficient concentration to form precipitates disposed in the matrix, wherein the cladding includes no more than about 20 ppm nitrogen by weight.

2. The cladding of claim 1 wherein the zirconium-based alloy matrix is selected from the group consisting of Zircaloy-2 and Zircaloy-4.

3. The cladding of claim 2 wherein the zirconium-based alloy matrix is a modified Zircaloy-2 having alloying elements present in the concentration ranges of about 0.05 to 0.09 weight percent iron, about 0.03 to 0.05 weight percent chromium, and about 0.02 to 0.04 weight percent nickel.

4. The cladding of claim 2 wherein the precipitates have an average size distribution within the zirconium-based alloy matrix of at least about 0.2 micrometers in diameter.

5. The cladding of claim 2 wherein the precipitates have an average size distribution proximate to the inner surface of the zirconium-based alloy matrix of at least about a first predefined diameter and the precipitates have an average size distribution proximate to the outer surface of the zirconium-based alloy matrix of at most about a second predefined diameter, wherein the first predefined diameter is greater than the second predefined diameter.

6. The cladding of claim 5 wherein the first predefined diameter is about 0.2 micrometers and the second predefined diameter is about 0.1 micrometers.

7. The cladding of claim 2 wherein the cladding forms a cylindrical tubular container.

8. The cladding of claim 2 further comprising a zirconium barrier layer metallurgically bonded to the inner surface region of the cladding.

9. The cladding of claim 8 wherein the zirconium barrier layer is selected from the group consisting of crystal bar zirconium and sponge zirconium.

10. A fuel element comprising:
a cladding tube including a cross-section of a zirconium-based alloy matrix comprising the inner and outer surface regions, and alloying elements in sufficient concentration to form precipitates disposed in the matrix, wherein the cladding includes no more than about 20 ppm nitrogen by weight;
nuclear fuel material disposed within said tube; and
means for sealing the respective ends of said tube with said nuclear material therein.

11. The fuel element of claim 10 wherein the zirconium-based alloy matrix is a modified Zircaloy-2 having alloying elements present in the concentration ranges of about 0.05 to 0.09 weight percent iron, about 0.03 to 0.05 weight percent chromium, and about 0.02 to 0.04 weight percent nickel.

12. The fuel element of claim 10 wherein the precipitates have an average size distribution within the zirconium-based alloy matrix of at least about 0.2 micrometers in diameter.

13. The fuel element of claim 10 further comprising a pressurized gas within said nuclear fuel element.

14. The fuel element of claim 10 further comprising a zirconium barrier layer metallurgically bonded to the inner surface region of the container.

15. The fuel element of claim 14 wherein the barrier layer is selected from the group consisting of crystal bar zirconium and sponge zirconium.

16. A method of preparing a cladding for use in housing fissionable material in water cooled nuclear fission reactors, the cladding comprising inner and outer surface regions, the method comprising converting a Zircaloy tube containing at most about 20 ppm nitrogen to the cladding containing at most about 20 ppm nitrogen through a plurality of steps including cold working and annealing, wherein each step in the process that is conducted at a temperature above about 500° C. is conducted in an inert atmosphere.

17. The method of claim 16 wherein the plurality of steps includes a step of beta quenching the Zircaloy tube.

18. The method of claim 16 wherein the steps of the process that are conducted at a temperature above about 500° C. are conducted in a vacuum or an argon atmosphere.

19. The method of claim 16 wherein the plurality of steps includes a step of heating an outer region of the Zircaloy tube to a temperature of at least the alpha plus beta region while maintaining an inner region of the Zircaloy tube at a temperature below the alpha plus beta region.

20. The method of claim 16 wherein the plurality of steps includes a step of conditioning the surface of the cladding to remove an outer layer of material.

21. A cladding resisting nodular corrosion while used to house fissionable material in a water cooled nuclear fission reactor, the cladding comprising a zirconium alloy substrate having inner and outer surface regions, the substrate also having about 0.05 to 0.09 weight percent iron, about 0.03 to 0.05 weight percent chromium, and about 0.02 to 0.04 weight percent nickel, and having no more than about 30 ppm nitrogen by weight.

22. The cladding of claim 21 further comprising a zirconium barrier layer metallurgical bonded to the inner surface region of said substrate.

23. The cladding of claim 21 wherein the substrate further comprises precipitates having an average size distribution of at least about 0.2 micrometers.

24. The cladding of claim 21 wherein the substrate forms a cylindrical tubular container.

* * * * *